US009302577B2

(12) United States Patent
Catalan (10) Patent No.: US 9,302,577 B2
(45) Date of Patent: Apr. 5, 2016

(54) HALBACH ARRAY ELECTRIC MOTOR WITH SUBSTANTIALLY CONTIGUOUS ELECTROMAGNETIC CORES (71) Applicant: Roberto Sanchez Catalan, Round Rock, TX (US)

(72) Inventor: Roberto Sanchez Catalan, Round Rock, TX (US)

( * ) Notice: Subject to any disclaimer, the term of this patent is extended or adjusted under 35 U.S.C. 154(b) by 92 days.

(21) Appl. No.: 14/014,153

(22) Filed: Aug. 29, 2013

(65) Prior Publication Data
US 2015/0061440 A1 Mar. 5, 2015

(51) Int. Cl.
*H02K 1/27* (2006.01)
*B60K 7/00* (2006.01)
*H02K 21/12* (2006.01)
*H02K 21/22* (2006.01)
*H02K 41/03* (2006.01)
*H02K 1/14* (2006.01)
*H02K 7/14* (2006.01)

(52) U.S. Cl.
CPC .................. *B60K 7/00* (2013.01); *B60K 7/0007* (2013.01); *H02K 1/148* (2013.01); *H02K 21/12* (2013.01); *H02K 21/22* (2013.01); *H02K 41/031* (2013.01); *B60K 2007/0038* (2013.01); *B60K 2007/0092* (2013.01); *H02K 1/278* (2013.01); *H02K 1/2786* (2013.01); *H02K 7/14* (2013.01); *Y10T 29/49009* (2015.01)

(58) Field of Classification Search
CPC ....... H02K 41/031; H02K 7/09; H02K 1/278; H02K 21/24; H02K 1/17; H02K 15/03; H02K 21/12; H02K 21/22; H02K 1/148; H02K 7/14; B60K 7/00; B60K 7/007; B60K 2007/038; B60K 2007/0092; Y10T 29/49009

USPC .................................................... 310/216.111
See application file for complete search history.

(56) References Cited

U.S. PATENT DOCUMENTS

| | | | |
|---|---|---|---|
| 5,705,902 A | 1/1998 | Merritt et al. | |
| 6,841,910 B2 | 1/2005 | Gery | |
| 6,858,962 B2 | 2/2005 | Post | |
| 6,906,446 B2 | 6/2005 | Post | |
| 7,031,116 B2 | 4/2006 | Subrahmanyan | |
| 7,291,953 B1 * | 11/2007 | Smith et al. | 310/112 |
| 7,352,096 B2 | 4/2008 | Dunn et al. | |
| 7,540,004 B2 | 5/2009 | Lee et al. | |
| 7,541,813 B2 | 6/2009 | Synder, Jr. et al. | |
| 7,560,841 B2 * | 7/2009 | Honkura et al. | 310/156.43 |
| 7,598,646 B2 | 10/2009 | Cleveland | |
| 7,737,594 B2 * | 6/2010 | Abe et al. | 310/156.53 |
| 7,965,010 B2 * | 6/2011 | Froeschle et al. | 310/156.43 |
| 8,009,001 B1 | 8/2011 | Cleveland | |
| 8,183,731 B2 | 5/2012 | Epstein et al. | |
| 8,513,849 B2 | 8/2013 | Epstein et al. | |
| 8,638,016 B2 * | 1/2014 | Fullerton et al. | 310/156.35 |
| 8,760,030 B2 * | 6/2014 | Ross et al. | 310/261.1 |

(Continued)

Primary Examiner — Michael Zarroli
(74) Attorney, Agent, or Firm — Peter Kramer (57) ABSTRACT Dual Halbach array element electric motor/generator with paired enhanced sides and substantially contiguous vertical and horizontal electromagnetic cores, comprised of a plurality of electromagnets arranged in Halbach array sequence, with horizontal cores equipped with fork-like prongs to provide substantial contiguity with vertical cores, assembled to serve as a circular or linear stator, rotor, or both, and a plurality of permanent magnets likewise arranged in a Halbach array sequence, assembled to serve as a circular or linear stator or rotor where required, with the enhanced sides of each Halbach array element, as rotor and stator, are paired together.

1 Claim, 8 Drawing Sheets

(56) References Cited

U.S. PATENT DOCUMENTS

| | | | |
|---|---|---|---|
| 2003/0094873 A1* | 5/2003 | Kim et al. | 310/156.43 |
| 2012/0091832 A1* | 4/2012 | Soderberg | 310/44 |
| 2012/0174901 A1* | 7/2012 | Post | 124/3 |
| 2013/0207488 A1* | 8/2013 | Labbe et al. | 310/43 |
| 2014/0191624 A1* | 7/2014 | Jahshan | 310/68 B |
| 2014/0312716 A1* | 10/2014 | Hunter et al. | 310/12.18 |
| 2015/0015354 A1* | 1/2015 | Catalan | 335/297 |

* cited by examiner

HALBACH ARRAY ELECTRIC MOTOR WITH SUBSTANTIALLY CONTIGUOUS ELECTROMAGNETIC CORES

FEDERALLY SPONSORED RESEARCH

Not applicable

SEQUENCE LISTING OR PROGRAM

Not applicable

BACKGROUND

1. Field of Invention

This invention relates to a novel Halbach array electric motor with substantially contiguous electromagnetic cores, which is applied to an in-wheel electric motor as one sample implementation thereof.

Generally the goal of implementing Halbach arrays in electric motors is to maximize efficiency, increase power or to reduce size and weight by harnessing the Halbach effect; otherwise an ordinary unenhanced motor would suffice. A stack of coated thin sheets of high-silicon electrical steel that comprise the vertical and horizontal cores have a magnetic resistance that is a thousand times less than empty air. This means that relying upon empty air to transmit magnetic flux is massively inefficient compared to using a magnetically permeable core.

While permanent magnets are pure polar cores, electromagnets are in sharp contrast, generally comprised of a magnetically permeable metal core and a magnetic coil. Because of the specific orientation required to enable the Halbach array effect, electromagnets cannot merely be arranged like permanent magnets with the expectation of successfully creating a strong Halbach array effect, since the magnetic coils prevent physical contact between the electromagnet's vertical and horizontal cores.

It is important to stress that magnetic coils are made of copper, different in composition and intended function to the laminations of high-silicon electrical steel that comprise the core. Moreover the copper is energized. The magnetic flux from the horizontal cores of the Halbach array will be blocked by the energized copper enveloping the vertical cores. And since copper is not the same as the non-energized, magnetically absorbent high-silicon electrical steel of the core, a significant amount of the magnetic flux from the horizontal core will end up dispersed and misdirected. Essentially, a motor or generator with electromagnets merely arranged as a Halbach array but without substantial contiguity (i.e. physical contact) between horizontal and vertical cores will have a severely diminished or even a completely disabled Halbach array effect. As a consequence, the motor will be massively inefficient and likely worse in performance when compared to an ordinary motor of the same dimensions.

As pointed out earlier, a core-less Halbach array comprised only of coils, while marginally lighter, would be a thousand times less efficient, consuming more power to achieve the same output as a motor with a magnetically permeable metal core, and is thus completely counter to the original reasons for implementing a Halbach array configuration in a motor or generator.

All of these foregoing problems and challenges have been resolved in the present invention.

2. Description of Prior Art

There are known numerous prior art devices which allege to be Halbach array motors, but are fundamentally different from the present invention due to the following reasons: a) only permanent magnet Halbach arrays are used on the rotor and ordinary, non-Halbach electromagnets are used as the stator, b) the electromagnets used are merely arranged to approximate a Halbach array sequence, but does not provide any means to provide substantial contiguity between its electromagnetic cores, which severely decreases or even completely negates the Halbach array effect, and c) only permanent magnet Halbach arrays are used, in combination with an external, ordinary electromagnet motor.

U.S. Pat. No. 8,513,849 including U.S. Pat. Nos. 8,183,731 and 7,352,096 are almost identical, and discloses a generator where permanent magnets are mounted on discs but spaced so far apart for a Halbach array in the supplied drawings that it is unlikely to provide a strong Halbach array effect. Likewise the electromagnets used are clearly non-Halbach, and neither do they show a means to provide substantial contiguity between cores. These three patents are thus completely different from the present invention. Interestingly, none of the drawings in these patents depict a valid Halbach array sequence.

U.S. Pat. Nos. 6,906,446 and 6,858,962 are almost identical, and discloses generator featuring a permanent magnet Halbach array on the stator, but the rotor is non-Halbach, and is thus different from the present invention.

U.S. Pat. No. 7,598,646 discloses a bicycle wheel equipped with a Halbach array, where the motive force for the bicycle wheel are two external arches comprised of electromagnets that are merely arranged in Halbach Array formation, on either side. The provided drawings clearly show that the electromagnets used have no means to provide substantial contiguity between cores, which are isolated by the energized magnetic coils. This will severely diminish or even negate the Halbach array effect, and is thus fundamentally different from the present invention.

U.S. Pat. No. 7,541,813 for cylindrical Halbach sequenced electromagnets used as a resistivity tool in oil drilling and is thus fundamentally different from the present invention.

U.S. Pat. No. 5,705,902 for a generator with octagonal induction bars but implemented as an ironless or coreless system, and is thus fundamentally different from the present invention.

U.S. Pat. No. 6,841,910 discloses a magnetic coupling for pumps that uses a Halbach array that is driven by an external drive motor, it is thus very different from the present invention.

U.S. Pat. No. 8,009,001 discloses a means of concentrating Halbach Arrays to create a 'hyper' Halbach using permanent magnet arrays. This is purely about arranging permanent magnets and fundamentally different from the present invention.

U.S. Pat. Nos. 7,540,004 and 7,031,116 discloses a Halbach array used as part of an actuator or coil on a magnetic head for hard disks, and is thus fundamentally different from the present invention.

Launchpoint Technologies developed a closed electric hub motor for unmanned aerial vehicles (UAVs) that uses two backing plates equipped with permanent magnets in Halbach array sequence sandwiching a non-Halbach array stator that has three phase Litz wire winding. It is thus very different from the present invention.

Protean Electric's™ In-Wheel Electric Drive discloses a fully-integrated in-wheel electric hub motor completely separate from the tire and alloy wheel. It does not make use of any Halbach arrays in its configuration. It is thus very different from the present invention.

Michelin™ ActiveWheels discloses an in-wheel implementation that derives propulsion from one small electric motor at one corner of the wheel, and the suspension system is integrated into the wheel's hub. This implementation is a gear-driven wheel powered by a micro motor. This implementation does not does not disclose a Halbach array configuration and is thus different from the present invention.

OBJECTS AND ADVANTAGES

Several objects and advantages to the present invention are:

(a) to harness the directed and magnified magnetic fields derived from the proper generation of the Halbach array effect in both rotor and stator to create electric motors for various applications such as handheld power tools, robotics, vehicles, boats and aircraft, etc., that will be much lighter, more energy efficient, smaller in size, and significantly more powerful than ordinary electric motors;

(b) to apply the benefits of Halbach array effects in the present invention to in-wheel motors for electric or hybrid vehicles as an example of a preferred embodiment thereof, and provide significantly more power than ordinary electric motors of the same size, or alternatively, to significantly reduce size and weight while retaining the same power output, which also helps to reduce unsprung mass and preserve the quality of the vehicle's ride;

(c) to enable in-wheel motors for electric or converted hybrid vehicles, provide greater flexibility and extra roominess in car designs by removing the need for a large internal combustion engine, transmissions and axles, which also significantly decreases the vehicle's overall weight, enable seamless transitions from rear, front or all-wheel drive when necessary, conserve power by activating only a single wheel when required, maximize the regeneration of power back to the batteries during coasting or braking, thereby reducing the need for larger and heavier brake calipers and rotors, and to extend the effective driving range of the vehicle on a single charge via all the weight savings derived from the present invention; and (d) to open the possibility for the development of new motors, generators, actuators, pumps, transmissions, etc. by harnessing the magnified forces and dual-sided aspect of Halbach arrays.

Further objects and advantages shall become more apparent after considering the ensuing descriptions and drawings.

SUMMARY

In accordance with the present invention a Halbach array electric motor with substantially contiguous electromagnetic cores, comprising a plurality of electromagnets arranged in Halbach Array sequence, equipped with substantially contiguous cores, via horizontal cores that are equipped with fork-like prongs to provide substantial contiguity with the vertical cores, assembled to serve as a circular or linear stator, rotor or both, and a plurality of permanent magnets likewise arranged in a Halbach Array sequence assembled to serve as a circular or linear stator or rotor where required.

DRAWINGS

Drawing Figures

In the drawings, closely related figures have the same number but different alphabetic suffixes.

FIG. 4A shows an electric ring wheel motor on a spoke-less alloy wheel. Also shown are the thin section bearings and how they are affixed onto the spoke-less alloy wheel. The customized linkages that joins that thin section bearings also serves as mounting points for the armatures that connect the vehicle's upper and lower suspension arms and steering arms are likewise shown. The Halbach array permanent magnets of the rotor are shown positioned between the outer rings of the thin section bearings, and the contiguous core electromagnets of the stator are likewise shown positioned between the inner rings of the thin section bearings. The braking system, similar to that built by Brembo™ for large sport motorcycles is not shown for the sake of clarity.

FIG. 5A shows a close-up view of the Halbach array electromagnets. It is applicable for both circular and linear stators. Clearly shown are the fork-like prongs on the horizontal cores and how it slips through the magnetic coils that surround the vertical cores to provide direct physical contact between cores, which is critical for generating a strong Halbach array effect. Likewise shown are the three phase cables from the stator. The optional electrical insulation sheets comprised of Nomex™ and Mylar™ typically installed in the apertures or surfaces where the magnetic coils are wound are not shown because it is too thin to appear on the image.

REFERENCE NUMERALS IN DRAWINGS

101 Permanent magnets arranged in Halbach Array sequence (of the rotor)
102 Electromagnets arranged in Halbach Array sequence (of the stator)
103 Alloy wheel
104 Three-phase cables and optional Hall sensor cables from the stator
105 Stator mounting
204 Epoxy adhesive or filling
205 Alloy flanges
301 Orientation of Halbach array permanent magnets
302 Orientation of Halbach array electromagnets
303 Attachment point for the stator mounting
401 Thin section bearings
402 Bearing linkages and mounting points
403 Spoke-less alloy wheel
501 Magnetic coils
502 Vertical electromagnets of the stator
503 Horizontal electromagnets of the stator
504 Fork-like prongs on the horizontal cores

DETAILED DESCRIPTION OF THE PREFERRED EMBODIMENT

A preferred embodiment is disclosed having dual Halbach array arrangement in an in-wheel electric motor. The dual Halbach array is comprised of permanent magnets arranged in Halbach array sequence 101, paired with electromagnets with substantially contiguous cores, likewise arranged in Halbach array sequence 102. Compared to ordinary magnets or electromagnets with equal polar fields (i.e. 50% north pole and 50% south pole), in a Halbach array, the magnetic field on one side of the array is augmented or enhanced (the enhanced side) for example, to greater than 97%, while the opposite side (cancelled side) exhibits cancellation or reduction of the magnetic field to less than 3%. Analogously the enhanced side of a Halbach array sequence of electromagnets with substantially contiguous cores may also be called the active side and the cancelled side may also be called the inactive side. However, the identity of active and inactive sides of a Halbach array sequence of electromagnets is not permanently fixed as in the case with permanent magnets arranged in Halbach array sequence. In some embodiments incorporating vertical and horizontal electromagnets with substantially contiguous cores arranged in Halbach array sequence, active and inactive sides may switch or interchange positions by reversing polarity of only the horizontal electromagnets. The terms, enhanced side, cancelled side, active side, and inactive side, which are used in this written description, should be understood to conform to lexicography as defined immediately above.

The following detailed description uses an in-wheel electric motor as but one example of a preferred embodiment of the present invention, since it can be implemented in a wide variety of other applications and devices.

By modifying a common automotive alloy wheel 103, and lining a section of the inner rim's circumference with permanent magnets arranged in a Halbach array sequence, 101 we essentially convert it into a rotor. To ensure that these permanent magnets are securely affixed onto the alloy wheel 103, epoxy adhesive 204 and alloy flanges 205 are generally used. This rotor is then paired with a stator, comprised of electromagnets that are likewise arranged in Halbach Array sequence 102.

Figure 5A:
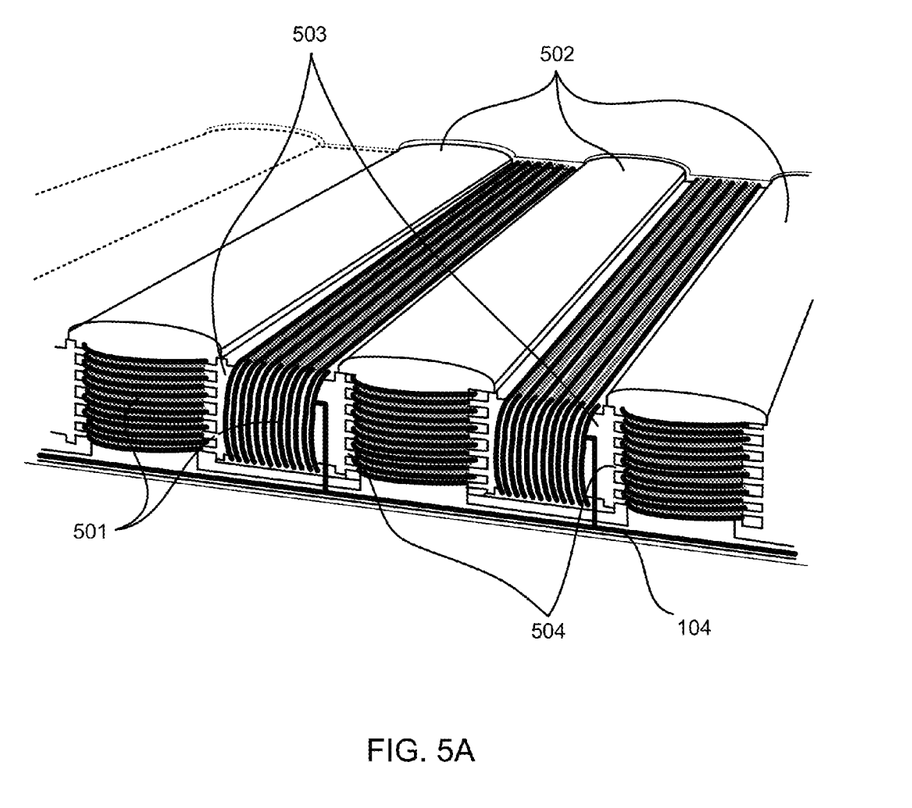

Each horizontal electromagnet 503 is equipped with fork-like prongs 504 that slip through gaps in the magnetic coils 501 of the adjacent vertical electromagnets 502 to establish substantial contiguity between the electromagnetic cores, thereby ensuring the maximum possible transmission of magnetic flux required to generate a strong Halbach array effect between adjacent electromagnets.

Figure 6A:
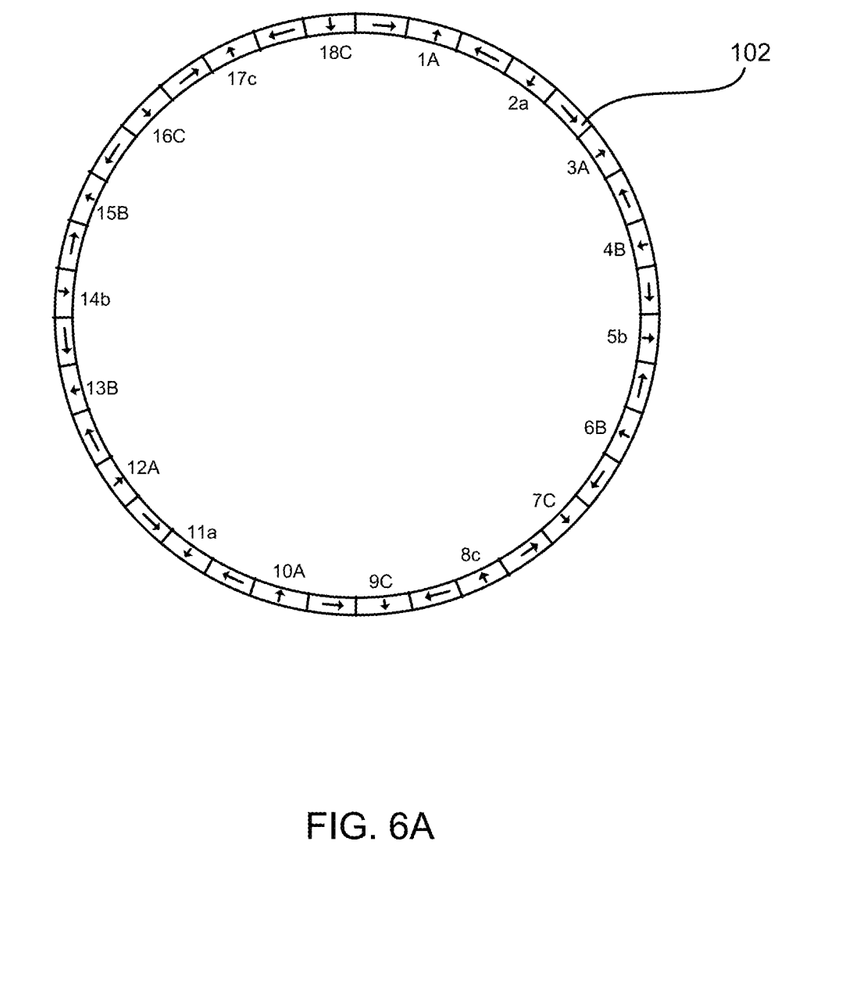
FIG. 6A shows the codes used for winding magnetic coils around each vertical electromagnet in the correct sequence and direction, the full instructions for which are found in the detailed description section. The same code sequence will be followed for each horizontal electromagnet. The wires for each three phases for magnetic coils of the vertical and horizontal cores are also shown.

The magnetic coils 501 of each vertical electromagnet 502 will be wound according to the diagram in FIG. 6A. The same wiring instructions will also be used for the horizontal electromagnets 503. It should be noted that there are many other possible wiring options (i.e Star/Wye, Delta, LRK, etc.), and the choice significantly affects the characteristics (i.e. speed, peak torque and amps drawn) of electric motor that is being created. For this specific preferred embodiment example, we shall use the 'star or wye' winding for a brushless DC motor.

There are three separate wiring phases, A, B, and C. Winding is clockwise if the letter is capitalized, and counter clockwise if the letter is in lower case in FIG. 6A. For example, AaBbCc means: For Phase 'A'/Wire 1, wind the tooth/core 1 clockwise, then continue to tooth/core 2 and wind it counter clockwise. For Phase 'B'/Wire 2, wind the tooth/core 3 clockwise, then continue to tooth/core 4 and wind it counter clockwise. For Phase 'C'/Wire 3, wind tooth/core 5 clockwise, then continue to tooth/core 6 and wind it counter clockwise. This will continue until all the cores are properly wound.

Once done one end of all of the three phase wires A, B, and C will be soldered together to complete the 'star or wye' winding scheme. Then the other end of the same combined three phase wires A, B, and C for both vertical 502 and horizontal 503 electromagnets will be separately connected to the A, B, and C terminals on the 3-phase motor controller shown in FIG. 7A.

Sensorless commutation using Texas Instruments'™ InstaSpin™ controllers is used in this preferred embodiment. Hall sensors, while optional in this example, is recommended if a fine degree of control is required at low rotational speeds.

Figure 3A:
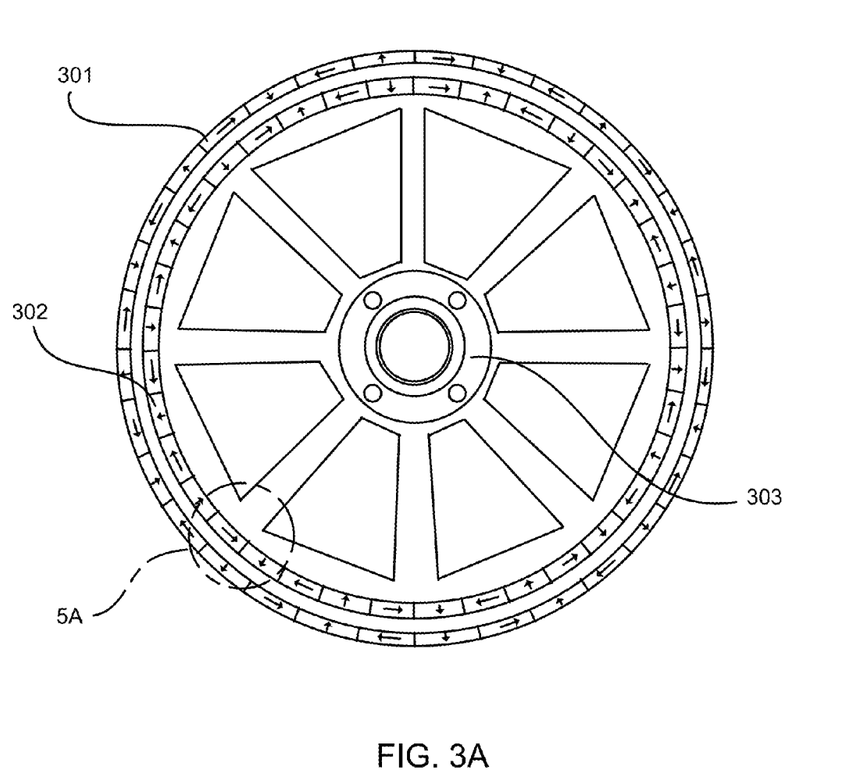
FIG. 3A shows the orientation for 32 Halbach array permanent magnets (essentially 16 primary poles on the outer ring), and the orientation of each of the 36 Halbach array electromagnetic cores (effectively 18 vertical primary electromagnetic cores on the inner ring) to enable the unidirectional and magnified Halbach Array effect. It also shows the central attachment point of the stator mount. It further shows a dual Halbach array arrangement with arrays 301 and 302 oriented with facing paired enhanced sides. The source of the close up view in FIG. 5A is likewise shown in this diagram.

The correct orientation of the Halbach array permanent magnets 301 for this particular example, in relation to the orientation of the Halbach array electromagnets 302 can be found in FIG. 3A, which also shows the central attachment point for the stator mounting 303 and the source of the detailed close up view of the electromagnets shown in FIG. 5A.

The entire set of electromagnets arranged in Halbach array sequence (i.e. the stator) 102 including the full length of the three-phase cables and optional Hall sensor cables from the stator 104 will generally be coated several times with insulating and waterproofing polymers and water phobic solutions similar to that offered by Liquipel™ and HzO™.

Figure 1A:
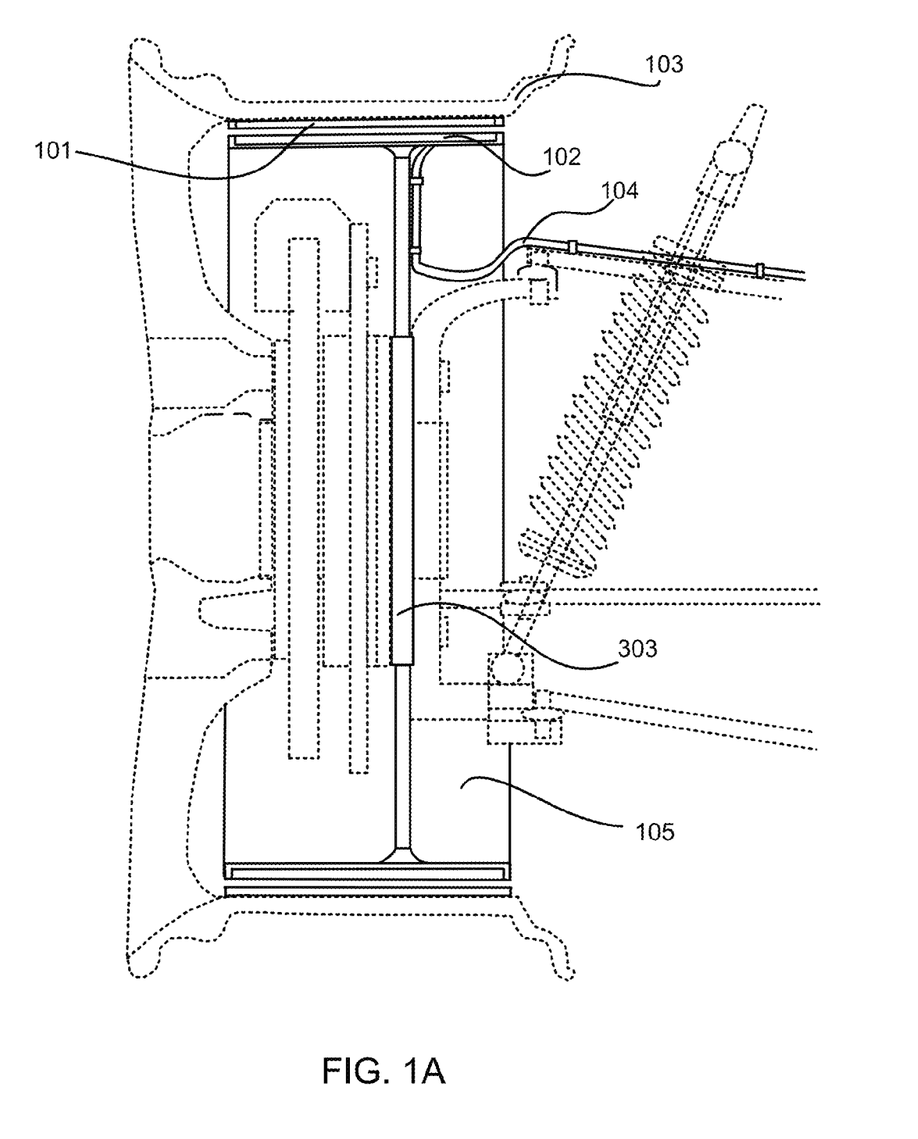
FIG. 1A shows a cut-away view of an alloy wheel that has a cylindrical rim, and the how the Halbach array permanent magnets are directly attached to the inner rim and secured by alloy flanges to create a rotor. It also shows the stator mounting for the Halbach Array electromagnets. The figure shows how the present invention can be easily adapted to the vehicle with minimal modification. Notice how the attachment for the stator mounting is offset more towards the vehicle's body so that a conventional brake rotor and caliper and suspension system can still be used, and how it is connected to the steering knuckle assembly. The three phase cables and optional Hall sensor cable from the stator is also shown, secured and guided towards the main body of the vehicle.
Figure 1B:
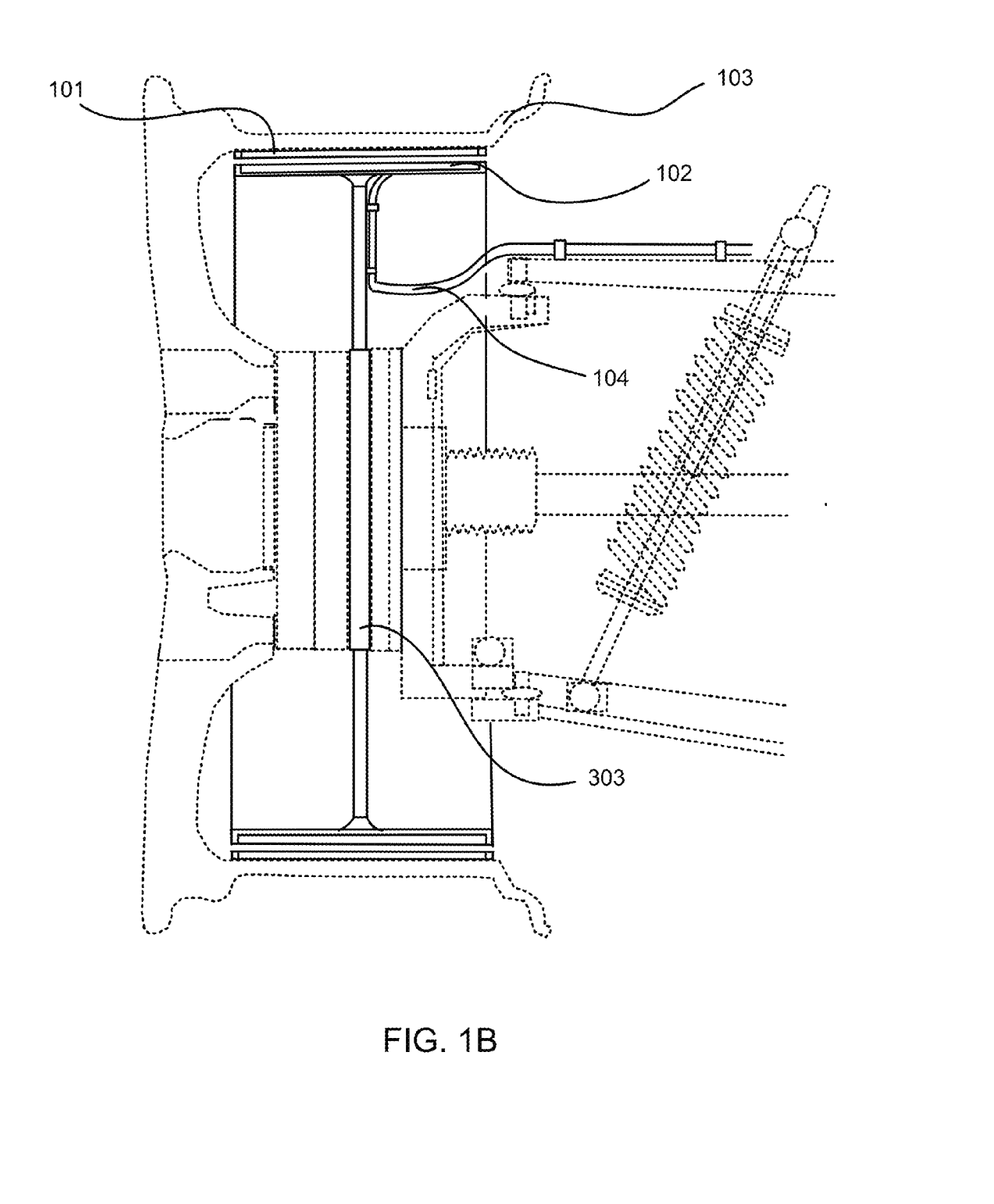
FIG. 1B also shows the same cut-away view of an alloy wheel that also has a cylindrical rim, however the stator mounting is now at the center of the alloy wheel rim width. This would be the case when the brake rotor and brake calipers are positioned inboard on the chassis of the vehicle, and thus requires the central axle as shown. This configuration will decrease unsprung weight and to improve handling even further.
Figure 2A:
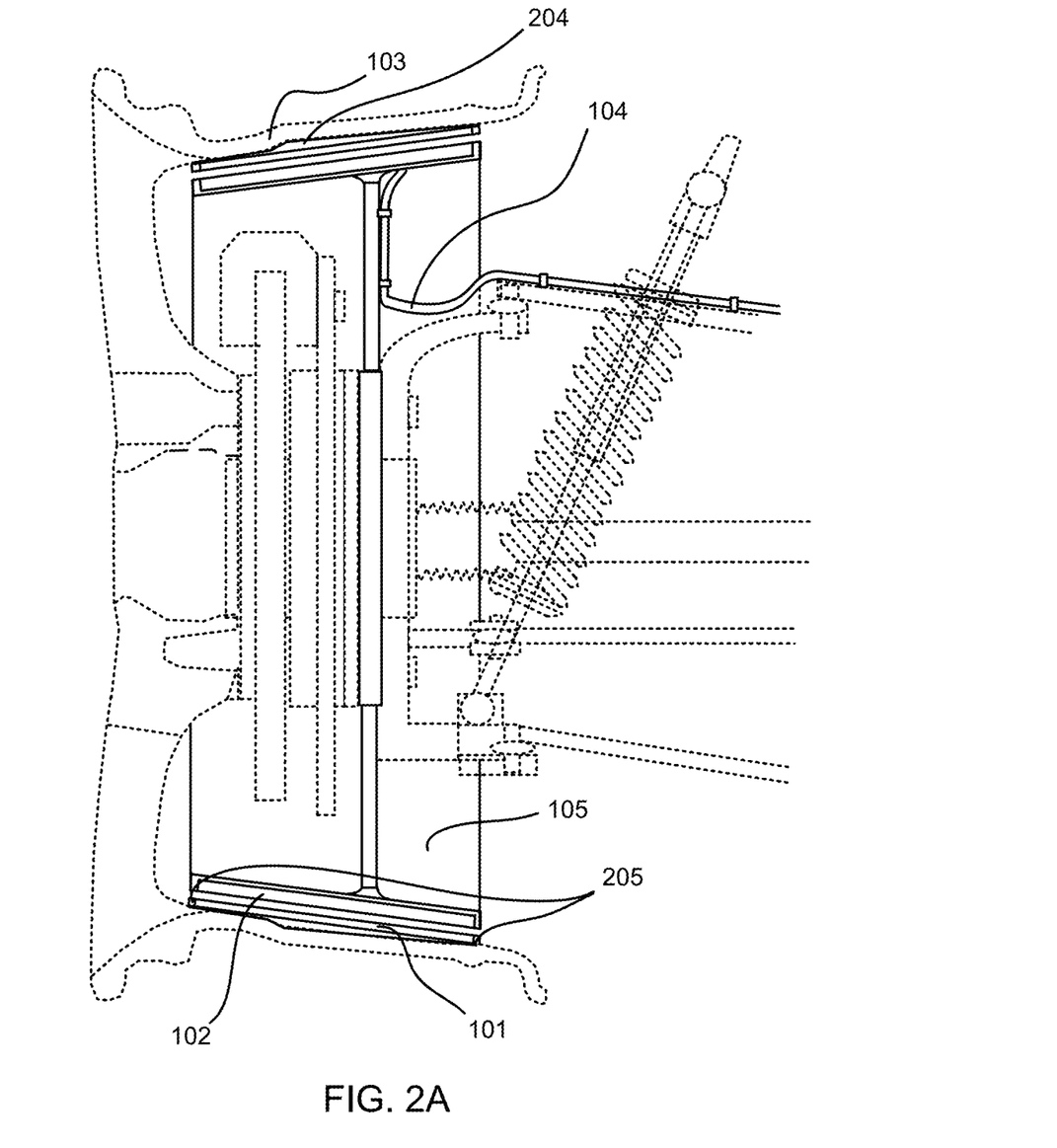
FIG. 2A shows another cut-away view of an alloy wheel but this time on a funnel-shaped inner rim. It also shows how the stator and stator mounting conforms to the alloy wheels' shape and how it is attached to the vehicle's suspension system. Also shown is where epoxy adhesive and filling would be applied to affix the Halbach array permanent magnets to the alloy wheels.

The completed Halbach array stator 102 is then placed on a stator mounting 105 that is shaped to match the inner rim of the alloy wheel 103, which is then affixed via the stator assembly's attachment point 303 to the vehicle's front or rear suspension system, typically at the steering knuckle assembly or hub carrier. The same attachment point can be moved closer to the body of the car to accommodate the brake rotors and calipers, as shown in FIG. 1A for an alloy wheel 103 with a cylindrical rim and FIG. 2A for an alloy wheel 103 with a funnel shaped rim. If the brakes are positioned inboard, the attachment point for the stator 303 will be at the center of the rim width, as shown in FIG. 1B.

Figure 4A:
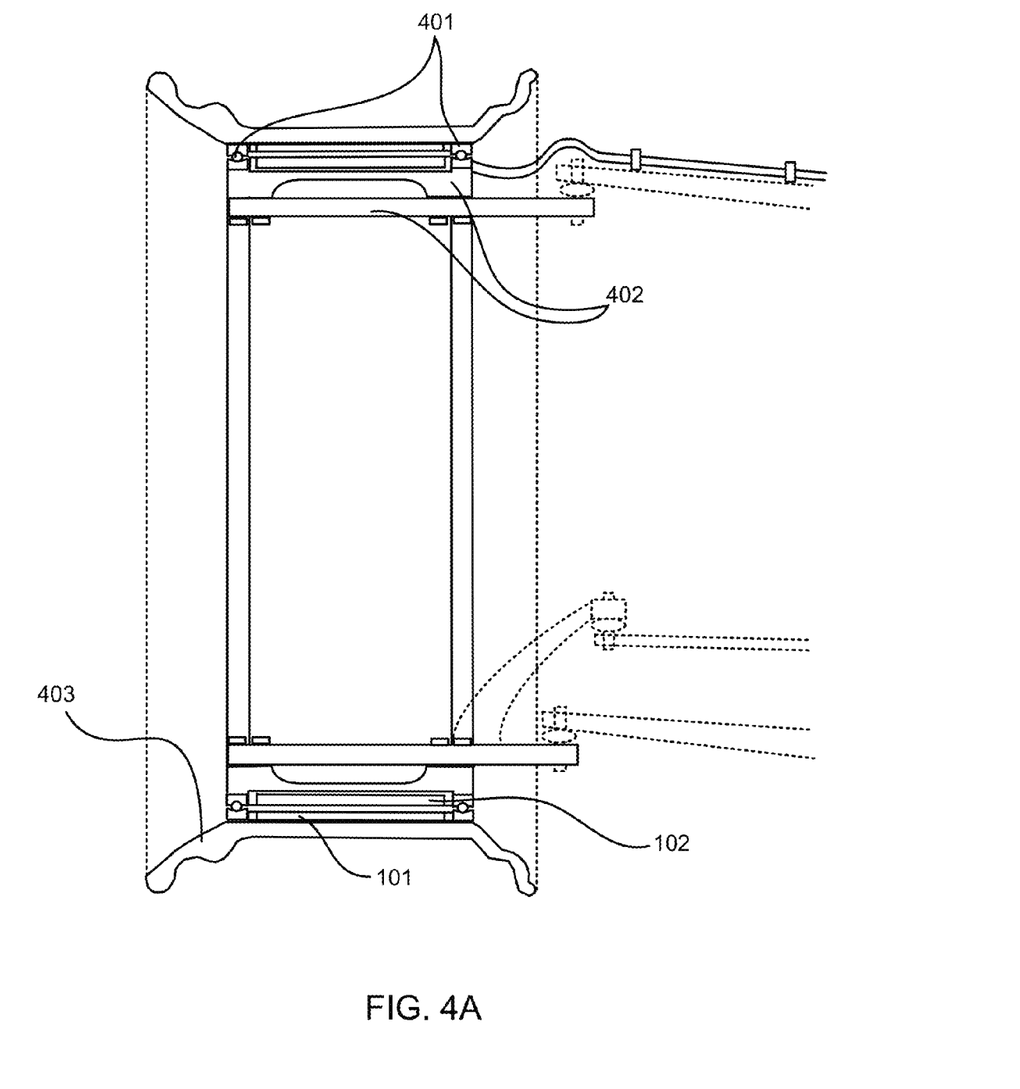

A slight variation of the preferred embodiment is to use thin section bearings 401 mounted directly onto the edges of the inner rim of a spoke less alloy wheel 403. These thin section bearings 401 are joined via linkages that also serve as mounting points 402 for the vehicle's suspension system. The permanent magnets of the rotor 101 are then positioned between the outer rings of the thin section bearings 401, and the electromagnets of the stator 102 are positioned between the inner rings of the thin section bearings 401, as shown in FIG. 4A. Brakes similar to that made by Brembo™ for use on large sports bikes are not shown in the diagram for the sake of clarity.

Alternative Embodiments

An alternative embodiment for the present invention is simply to invert the configuration of the preferred embodiment; to use a contiguous core electromagnetic Halbach array as the outer stator, and a permanent magnet Halbach array as the inner rotor.

Another alternative embodiment is to adapt the present invention for connection to an AC motor controller rather than DC. The wiring of the electromagnetic cores (which are still configured as Halbach arrays) will be changed to near-90 degree phases to achieve fields that are near sinusoidal (and near cosusoidal), to create a three-phase synchronous AC contiguous core Halbach array electric motor.

Perhaps the most interesting alternative embodiment of the present invention is to fully harness both sides of the contiguous core Halbach array electromagnet (i.e. a stator), since this can easily be done by separately wiring the vertical and horizontal Halbach array electromagnets' phases to dual channel motor controllers, or multiple controllers working simultaneously via a bus or signal network. As an example, by sandwiching the stator between two concentric permanent magnet rotors (which are ideally Halbach arrays) and by connecting armatures to both rotors, alternating vertical movement can be provided while horizontally rotating in either direction, with a considerable speed and torque. This opens up possibilities for a multitude of novel applications or devices in the field of pumps, transmissions, clutches, couplings, drill heads, robotics, etc.

Operation

Preferred Embodiment

Figure 7A:
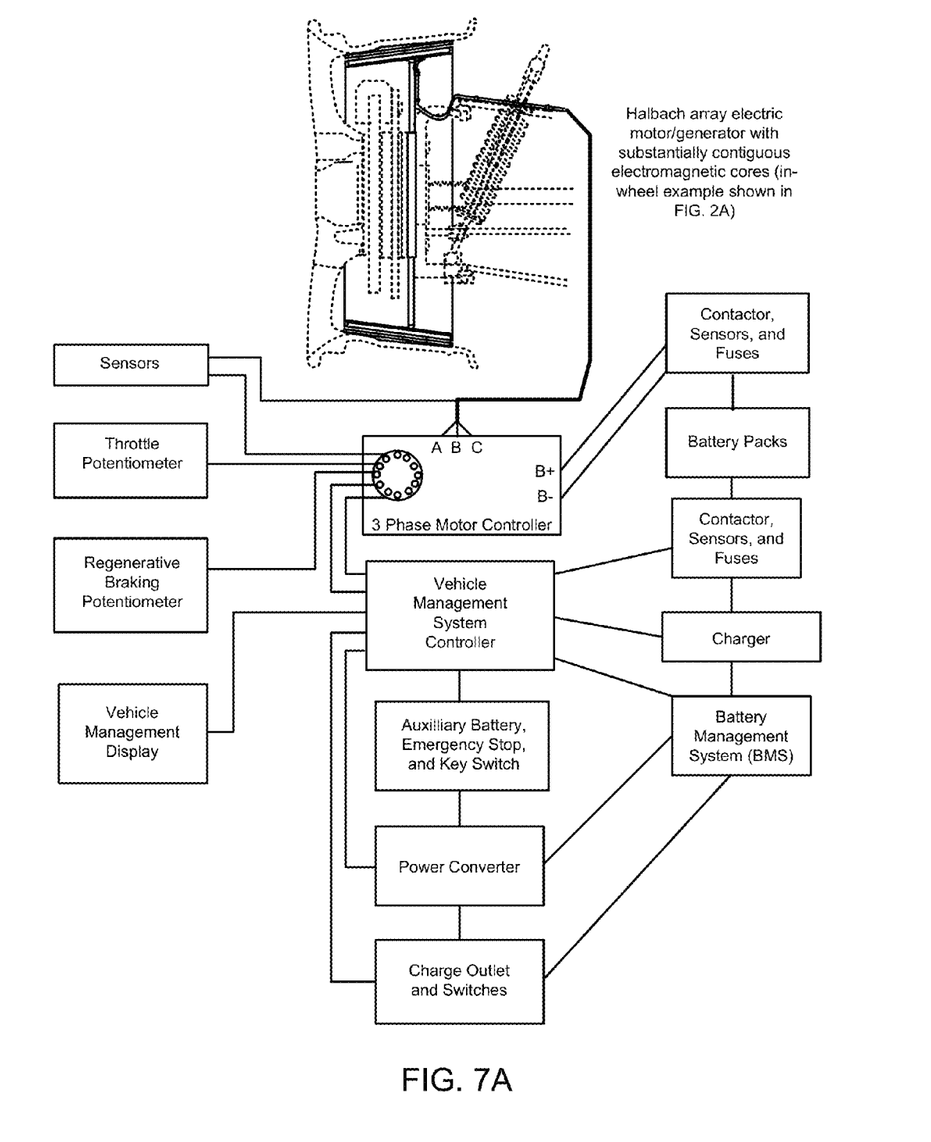
FIG. 7A shows how the present invention, in the preferred embodiment of an in-wheel electric motor, is connected to a 3-phase motor controller, and includes a simplified block diagram of other commercially-available electronic and electrical components that would be needed to assemble a working electric or hybrid vehicle. However, just as there are many different kinds of cars, there are also a multitude of possible combinations for control and power schematics for electric vehicles. This simplified and generic diagram is only provided for completeness.

Once our preferred embodiment example, the in-wheel electric motor is properly completed, tested and mounted onto a vehicle, all that remains to be done to operate it, as seen in FIG. 7A, is to connect the stator's three-phase cables and optional Hall sensor cables 104 to a three-phase DC motor controller. This controller can be procured from Kelly Controls™, Roboteg™, Texas Instruments™, or if you can find remaining stock on Ebay™, from the now defunct Azure Dynamics™.

Sensorless commutation using Texas Instruments'™ InstaSpin™ brushless DC motor controllers is the preferred means of animating the present invention due to its simplicity. Generally however, Hall sensors will be required if a fine degree of control is desired at lower rotational speeds.

Once the present invention is connected as shown in FIG. 7A, force applied to the throttle potentiometer boxes and the regenerative braking potentiometer boxes would be analogous to stepping on the gas pedal and brake pedal respectively, on a conventional gas-powered car. The diagram also shows how all the other components (i.e. the 'ignition' key switch, the subsystems for monitoring, charging and converting power from the battery packs, the auxiliary battery circuitry and overall vehicle management system controller, etc.) are organized and how they interact to complete the assembly of an electric car. Most importantly the diagram also shows how contactors, fuses, diodes, sensors and an emergency shutoff switch are organized to ensure safe operation of an electric vehicle.

CONCLUSION, RAMIFICATIONS AND SCOPE

Accordingly, the reader will see that the present invention provides a viable and effective means for establishing the strongest possible Halbach array effect from electromagnets, basically by providing substantial contiguity between the vertical and horizontal stator cores, and pairing this with permanent magnet Halbach arrays to create new, more powerful and more efficient electric motors.

All ordinary electric motors have magnetic fields that are equally distributed (i.e. 50:50) between north and south poles. While adding more magnetic coil can result in a stronger magnetic field, the other 50% of the magnetic energy will still go to waste, usually only serving to complete an electrical circuit through a metal backplate.

By properly harnessing the Halbach array effect, the present invention can potentially generate a magnetic distribution greater than a 97:3 between its two poles. Nearly all of the magnetic force is applied in the direction where it is needed, as if it were a monopole magnet. Almost none of the energy goes to waste. With Halbach arrays, no heavy backplate is required since it is a complete electrical circuit in and of itself.

The present invention solves a long existing and yet long unresolved need for maximizing the efficiency of electric motors. It is said that a full one-third of all power on the planet is consumed by electric motors of some sort. As such, increasing the efficiency of electric motors by correctly harnessing Halbach array effect can potentially save billions of dollars in energy consumption every year, thereby helping to preserve the earth's rapidly dwindling resources.

While the above description contains many specificities, these should not be construed as limitations on the scope of the invention, but rather as an exemplification of one preferred embodiment thereof. Accordingly, the scope of the invention should be determined not by the embodiments illustrated, but by the appended claims and their legal equivalents.

I claim:

1. A method for harnessing both sides of a Halbach array sequence of electromagnets having substantially contiguous vertical and horizontal cores, as a component within a dual Halbach array element electric motor/generator with paired enhanced sides, to enable tandem functionality with an external or integrated complementary device, such as another Halbach array rotor, comprising:

(a) designing and assembling electromagnets arranged in Halbach array sequence, said electromagnets having vertical cores and horizontal cores, said horizontal cores having fork like prongs arranged to provide substantial contiguity with said vertical cores, said electromagnets further arranged in a manner that keeps both sides clear of obstacles, (b) separating phase wiring of vertical and horizontal electromagnets, and attaching each set to dual channel motor controllers, or multiple motor controllers working simultaneously via a bus or signal network, or other similar apparatus, (c) providing the inactive side of said electromagnets arranged in Halbach array sequence with an external or integrated complementary device matching that on the active side, such as an additional rotor, which may have electromagnets or permanent magnets, wherein the additional rotor may also be configured with its electromagnets or permanent magnets as Halbach arrays, (d) switching the polarity, only of horizontal electromagnets, once, to cancel out the magnetic forces on the previously active side and elastically transfer the focus and power of said electromagnets arranged in Halbach array sequence to the other, formerly inactive side, towards said complementary device, (e) switching or commutating simultaneously thereafter, via said motor controllers or similar apparatus, both vertical and horizontal electromagnets as needed, and (f) repeating as necessary, the foregoing switching process for the correct operation of the motor/generator or device, with the elastic reallocation of magnetic flux in the cancelled and enhanced sides of electromagnets arranged in Halbach array sequence having substantially contiguous vertical and horizontal cores, and essentially function as a dual-sided stator component.

* * * * *